United States Patent [19]

Green

[11] Patent Number: 4,605,969
[45] Date of Patent: Aug. 12, 1986

[54] VIDEO PATTERN NOISE PROCESSOR

[75] Inventor: Wayne T. Green, Mexico, N.Y.

[73] Assignee: General Electric Company, Charlottesville, Va.

[21] Appl. No.: 643,317

[22] Filed: Aug. 21, 1984

[51] Int. Cl.[4] .............................................. H04N 3/14
[52] U.S. Cl. .................................. 358/213; 250/578; 358/167; 357/24
[58] Field of Search ............... 358/212, 213, 167, 209, 358/221, 222, 336; 357/24 LR, 24, 22; 250/578

[56] References Cited

U.S. PATENT DOCUMENTS

| | | | |
|---|---|---|---|
| 4,079,422 | 3/1978 | Anagnostopoulos | 358/213 |
| 4,079,423 | 3/1978 | Diehl | 358/213 |
| 4,158,209 | 6/1979 | Levine | 358/31 |
| 4,212,034 | 7/1980 | Kokie et al. | 358/213 |
| 4,307,423 | 12/1981 | Atherton | 358/213 |
| 4,316,221 | 2/1982 | Swab | 358/213 |
| 4,387,402 | 6/1983 | Lewis | 358/213 |
| 4,434,441 | 2/1984 | Ishizaki et al. | 358/213 |
| 4,472,744 | 9/1984 | Inoue et al. | 358/293 |
| 4,495,523 | 1/1985 | Ozawa | 358/293 |
| 4,511,804 | 4/1985 | Ozawa | 250/578 |

Primary Examiner—Gene Z. Rubinson
Assistant Examiner—Robert G. Lev
Attorney, Agent, or Firm—Irving M. Freedman

[57] ABSTRACT

Low-frequency noise in the video output of a charge-injection-device imager is cancelled by delaying the low-frequency components of video plus noise for one horizontal interval and subtracting therefrom the undelayed noise from corresponding cells of the same row of the imaging matrix. High frequency noise is eliminated in a separate channel by low-level clipping of the high-frequency component of the video signal. The high-frequency video component is delayed for one horizontal interval to align it with the low-frequency video component and the two components are summed to reconstruct the full video signal from which both high-frequency and low frequency noise is absent.

14 Claims, 8 Drawing Figures

VIDEO PATTERN NOISE PROCESSOR

BACKGROUND OF THE INVENTION

The present invention relates to electro-optical imaging systems and, more particularly, to video processing apparatus for solid state imaging systems.

Electro-optical imaging sensors are roughly divided into camera-tubes contained within evacuated envelopes and solid state imaging sensors in which a charge pattern is created by the impingement of light on a solid state matrix array. One type of solid state imaging sensor, which forms the environment with which the present invention is employed, is commonly known as a charge-injection device (CID). The principles underlying charge-injection device imagers are detailed in U.S. Pat. Nos. 3,805,062; 3,949,162; 4,000,418; 4,011,441 and 4,011,442, the disclosures of which are herein incorporated by reference.

In brief, a charge-injection device employs a silicon substrate having orthogonal row and column conductors thereon which are insulated both from the substrate and from each other. Each intersection of a row conductor with a column conductor provides two storage locations, one under the row conductor and the other under the column conductor, within which charges liberated from the silicon substrate by incident radiation may be stored by the application of appropriate voltages. The stored charges, when appropriately read out, form the video signal.

Using an appropriately doped silicon substrate such as, for example, an n-type semiconductor, a negative voltage applied to a row or column conductor is effective to produce a depletion region forming a potential well thereunder. The potential well functions as a capacitor to collect the charges liberated by incident radiation. Although mutually insulated, the potential wells under the row and column conductors at an intersection thereof are so closely coupled that charges may be transferred back and forth therebetween without loss of stored charge. Whichever one of the row and column conductors is maintained at the more negative potential captures all of the charge from the one maintained at a less negative potential. In order to transfer the charge from beneath one conductor to beneath the other conductor, the voltage on the conductor originally having the larger negative voltage is reduced to a value less than the negative voltage on the originally less negative conductor. Equivalently, the negative voltage on the previously less negative conductor may be increased until it exceeds the negative voltage on the first-mentioned conductor.

In one technique described in the referenced patents, at all times except during the reading-out process, the row conductors are maintained more negative than the column conductors. The liberated charges are therefore totally contained under the row conductors. In preparation for reading out a row, the row voltage is raised until it attains a less-negative voltage intermediate the column voltage and ground. This transfers all of the accumulated charges simultaneously in the selected row from beneath all of the row conductors to beneath their respective column conductors. The negative voltages on the column conductors are then increased one at a time in sequence to a less negative voltage than the selected row conductor. The less negative voltage may conveniently be zero volts. As the voltage on each column conductor is increased to zero, the charge stored thereunder flows back beneath its associated row conductor within the row being read out. The flow of charges in the row conductor occasioned by the transfer of charge from each column conductor is sensed to produce the output video signal. It should be noted that, since the only column conductors which contain charges are those in the selected row, the voltage sequence on the column conductors is ignored by all storage locations except those in the selected row.

The readout sequence described above is non-destructive; that is, at the end of reading the stored charges in a row, the charges, although they have been transferred first from beneath the row conductors to beneath the column conductors and then have been sequentially transferred back again, remain in their original locations, undiminished. If the original voltages are restored on the row and column conductors, continued integration of incoming radiation without erasure of the previously stored charges may be performed. This is especially useful in low-light-level applications. In normal imaging applications, it is useful to erase the stored charges in a row just after it is read out so that a new charge pattern may be integrated until the next time the row is scheduled for readout. The charges in a row are readily cancelled or erased by raising the selected row voltage to zero while the column voltages are also at zero. This injects sufficient charges into the storage locations to cancel any charge pattern which they may have acquired, and hence the name "charge-injection device".

Noise is a problem in all imaging devices. The type of noise and its severity varies with the type of imaging device and with its required peripheral equipment. I have discovered that charge-injection imaging devices suffer from two sources of noise giving rise to pattern noise; namely, switching noise and capacitance variation noise.

The magnitude of the video output signal of a charge-injection device is usually a small fraction of the magnitude of the column-select signal voltage which is applied to the column conductors. The mutually insulated row and column conductors function as small capacitors which couple a portion of the column-select voltage for superposition onto the video signal on the selected row conductor on which the video signal is transmitted to external circuits. For common television signal rates, the column-select signal has frequency components in the range of 3.5 MHz, 7 MHz and higher. The 3.5 MHz components, in particular, produce a pattern noise in the video signal which is objectionable when large values of video gain are employed. Simple filtering of the video to remove the 3.5 MHz component is not desirable since such filtering would also remove significant video information existing in the vicinity of this frequency.

Capacitance variation noise is produced by slight differences in the values of capacitances of the cells making up the matrix. As a consequence, uniform illumination of all of the cells induces the storage of slightly different amounts of charge. In effect, the differences in cell capacitance produces a video signal variation from cell to cell even when all of the cells are uniformly illuminated. When a non-uniform scene is imaged on the matrix, the pattern noise produced by the capacitance differences is essentially superimposed on the video representing the scene. This effect is particularly troublesome when high video gain is used in low-light-level applications.

The prior art has taken advantage of the fact that the capacitance pattern of corresponding cells in adjacent rows is similar. Two adjacent rows are simultaneously enabled and read out by the same sequence of voltages on the row and column conductors. The pattern noise from the immediately preceding row, which was erased at the end of its readout, is inverted and subtracted, cell-by-cell, from the output of the row containing the desired video information. Due to the similar capacitances of corresponding cells in adjacent rows, the inverted pattern noise from an erased row, subtracted from the video plus pattern noise from corresponding storage locations in the immediately following row, cancels a substantial portion of the pattern noise originating in charge variation. This technique has permitted the successful use of charge-injection imaging devices in applications where their small size and ruggedness are an advantage.

Even after cancelling pattern noise using adjacent-row noise residue, a small residue of pattern noise remains due to the fact that, although adjacent-row storage locations are very similar, they are not, in fact, exactly the same. Thus, in demanding imaging applications including, for example, low-light-level imaging in which high video gain is required, a reduced but still-visible pattern noise is present.

U.S. Pat. No. 4,079,423 discloses a technique in which the output from the same row before and after video erasure is used for pattern-noise cancellation. The video data of a row, accompanied by its pattern noise, is delayed for one horizontal interval (1H) and is then added to the inverted undelayed pattern noise from the same line from which the video information has been erased. Since the sources of both of these signals are identical, improved cancellation is achieved. Any residue of pattern noise which remains after cancellation is inverted in succeeding lines to provide visual cancellation of pattern noise.

OBJECTS AND SUMMARY OF THE INVENTION

Accordingly, it is an object of the invention to provide a pattern noise processor which overcomes the drawbacks of the prior art.

It is a further object of the invention to provide a pattern noise processor which separates low-frequency and high-frequency components of pattern noise in a video signal and separately processes the low- and high-frequency components for cancellation of both capacitance variation noise and switching noise.

It is a further object of the invention to provide a pattern noise processor in which low-frequency video with pattern noise is delayed in one channel for cancellation by undelayed noise, and high frequency video is separately noise processed and delayed in a second channel. The delayed processed low-frequency and high-frequency components of the video signal, now minus noise, are combined to produce a clean video output signal.

It is a further object of the invention to provide a pattern noise processor using a single delay element to delay noise-processed, high-frequency video and unprocessed low-frequency video plus pattern noise. An undelayed low-frequency noise is subtracted from the combined delayed signal to cancel low-frequency noise.

Briefly stated, the present invention provides a pattern noise processor in which low-frequency noise in the video output of a charge-injection-device imager is cancelled by delaying the low-frequency components of video plus noise for one horizontal interval and subtracting therefrom the undelayed noise from corresponding cells of the same row of the imaging matrix. High frequency noise is eliminated in a separate channel by low-level clipping of the high-frequency component of the video signal. The high-frequency video component is delayed for one horizontal interval to align it with the low-frequency video component and the two components are summed to reconstruct the full video signal from which both high-frequency and low-frequency noise is absent.

According to an embodiment of the invention there is provided a pattern noise processor for cancelling pattern noise in a video signal from a charge-injection device, the charge-injection device being of a type which simultaneously reads out first and second signals, the first and second signals respectively containing contents of corresponding charge storage locations in first and second rows of the charge-injection device, the charge storage locations in the first row containing the video signal and pattern noise and the charge storage locations in the second row containing only pattern noise, having had any video therein erased comprising means for delaying one of the first and second signals for a predetermined time, the predetermined time being sufficient to coincide portions of the one of the first and second signals with portions of the other of the first and second signals originating in the same storage locations of the same row, means for differencing the delayed and undelayed signals to produce a noise-reduced signal, means for removing a high-frequency component of the noise-reduced signal above a predetermined frequency to produce a noise-reduced, low-frequency component, means for passing a high-frequency component of at least the first signal, the high-frequency component including all frequencies above the predetermined frequency, means for clipping portions of the high-frequency component having positive and negative amplitudes less than a predetermined value to produce a clipped high-frequency component, means for delaying the high-frequency component for the predetermined time to produce a clipped delayed high-frequency component and means for adding the clipped high-frequency component and the noise-reduced, low-frequency component.

According to a feature of the invention there is provided a pattern noise processor for cancelling pattern noise in a video signal from a charge-injection device, the charge-injection device being of a type which simultaneously reads out first and second signals, the first and second signals respectively containing contents of corresponding charge storage locations in first and second rows of the charge-injection device, the charge storage locations in the first row containing the video signal and pattern noise and the charge storage locations in the second row containing only pattern noise, having had any video therein erased comprising first low-pass means for passing a first frequency range of the first signal, the first frequency range including substantially all frequencies below a predetermined frequency, and for blocking substantially all frequencies above the predetermined frequency to produce a first low-frequency component, second low-pass means for passing the first frequency range of the second signal to produce a second low-frequency component, means for delaying one of the first and second low-frequency components for a predetermined time, the predetermined time being sufficient to coincide portions of the one of the first and second low-frequency components with portions of the other of the first and second low-frequency components originating in the same storage locations of the same row, means for subtracting the delayed and undelayed low-frequency components to produce a substantially pure low-frequency video component from which low-frequency components of the pattern noise are cancelled, high-pass means for passing all frequencies in at least the first signal higher than the predetermined frequency to produce a high-frequency component, means for clipping all portions of the high-frequency component having an amplitude lower than a predetermined positive and negative amplitude to produce a clipped high-frequency component, means for delaying the clipped high-frequency component for the predetermined time and means for adding the delayed clipped high-frequency component to the substantially pure low-frequency video component to produce a full-frequency video signal from which both low-frequency and high-frequency pattern noise are substantially eliminated.

According to a further feature of the invention there is provided a method for cancelling pattern noise in a video signal from a charge-injection device, the charge-injection device being of a type which simultaneously reads out first and second signals, the first and second signals respectively containing contents of corresponding charge storage locations in first and second rows of the charge-injection device, the charge storage locations in the first row containing the video signal and pattern noise and the charge storage locations in the second row containing only pattern noise, having had any video therein erased comprising delaying one of the first and second signals for a predetermined time, the predetermined time being sufficient to coincide portions of the one of the first and second signals with portions of the other of the first and second signals originating in the same storage locations of the same row, differencing the delayed and undelayed signals to produce a noise-reduced signal, removing a high-frequency component of the noise-reduced signal above a predetermined frequency to produce a noise-reduced, low-frequency component, passing a high-frequency component of at least the first signal, the high-frequency component including all frequencies above the predetermined frequency, clipping portions of the high-frequency component having positive and negative amplitudes less than a predetermined value to produce a clipped high-frequency component, delaying the high-frequency component for the predetermined time to produce a clipped delayed high-frequency component and adding the clipped high-frequency component and the noise-reduced, low-frequency component.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
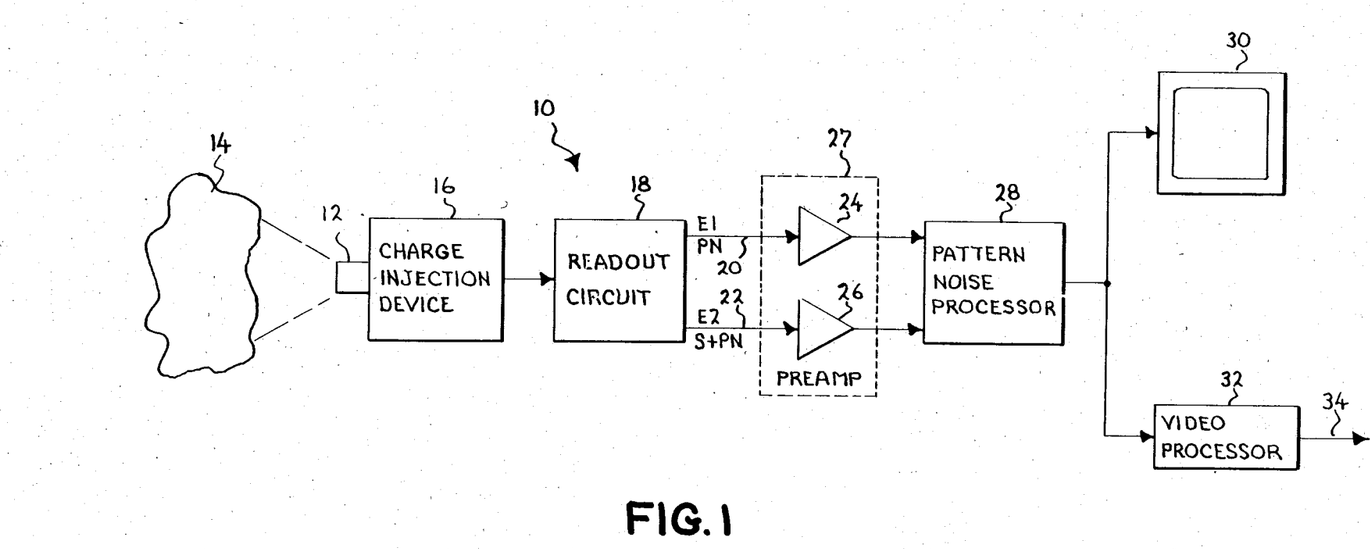
FIG. 1 is a simplified block diagram of a solid state imaging system according to an embodiment of the invention.

Referring to FIG. 1, there is shown, generally at 10, a solid state imaging system according to an embodiment of the invention. A lens 12 images a pattern of light intensities from a scene 14 onto a matrix array of a charge-injection device 16. Two video signals, E1 and E2, are read out from charge-injection device 16 by a readout circuit 8. Video signals E1 and E2 are applied on lines 20 and 22 to respective inputs of preamplifiers 24 and 26 in a preamplifier subsystem 27. Video signal E1, applied to preamplifier 24, contains only pattern noise PN from the sensor row which was read out and then erased in the immediately preceding horizontal interval. Video signal E2, applied to preamplifier 26, contains video plus unwanted pattern noise S+PN from the row immediately following the one providing signal E1.

A pattern noise processor 28, to be more fully detailed hereinafter, receives the amplified versions of video signals E1 and E2 and provides noise cancellation of both capacitance variation noise and switching noise from the video signal in order to provide substantially noise-free video to following circuits such as, for example, a video monitor 30 or a video processor 32. Video processor 32 may be, for example, a portion of a robotics system (the remainder of which is not shown) for performing pattern recognition, or other activity, on the video signal. The processed video from video processor 32 is applied on a line 34 to external circuits which are not of concern to the present invention.

In some embodiments of charge-injection device 16 and readout circuit 18, it is convenient to alternate the signals on lines 20 and 22 whereby, in one horizontal interval, line 20 contains the new video data and line 22 contains pattern noise and, in the next horizontal interval, line 22 contains the new video data and line 20 contains pattern noise. One skilled in the art would recognize that a conventional multiplexer (not shown) may be used following preamplifier subsystem 27 to alternately reverse the lines on which such signals are fed from readout circuit 18 to succeeding circuits and, in fact, such an embodiment is preferred.

Figure 2:
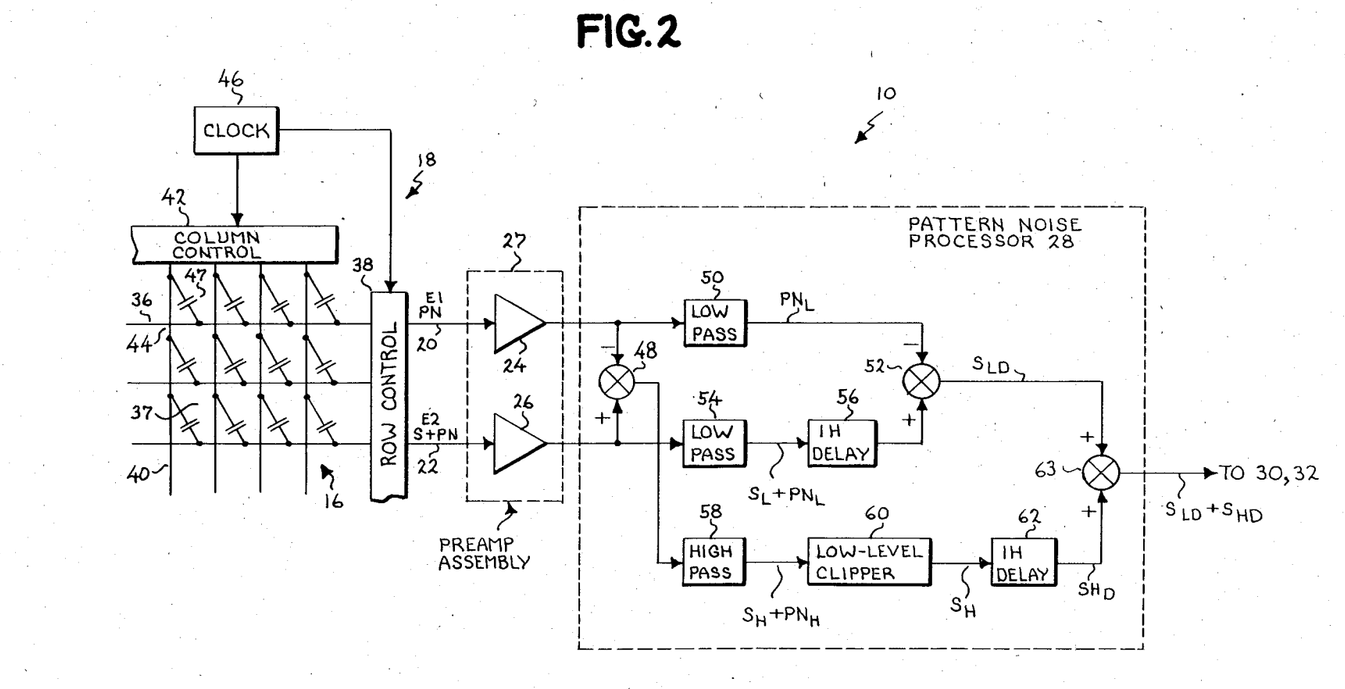
FIG. 2 is a block and schematic diagram of a solid state imaging system according to an embodiment of the invention.

Referring now to FIG. 2, there is shown a more detailed block diagram of the embodiment of the invention of FIG. 1. Charge-injection device 16 consists of a plurality of parallel row conductors 36 on a substrate 37, each connected to a row control circuit 38, and a plurality of parallel column conductors 40 on substrate 37, each connected to a column control circuit 42. Row conductors 36 and column conductors 40 cross at intersections 44 where they are mutually insulated from each other. A clock 46 provides appropriate timing signals for mutually timing the activities of row control circuit 38 and column control circuit 42. Each intersection 44 of a row conductor 36 with a column conductor 40 provides a sensing cell within which charges, liberated from substrate 37 by incident radiation, may be stored in the presence of an appropriate voltage as explained hereinabove. Each intersecting row conductor 36 and column conductor 40 provides an interline capacitance therebetween symbolized by a mutual capacitance 47 bridging each intersection 44. In addition to mutual capacitances 47, each row conductor 36 and each column conductor 40, in the vicinity of each intersection 44, exhibits a capacitance to substrate 37 which is herein understood to exist but is not shown in the interest of avoiding clutter in the drawing. For present purposes, readout circuit 18 and charge-injection device 16 are conventional and further details, beyond those mentioned above, are unnecessary for a full understanding of the invention and are therefore omitted herefrom but may be found in the referenced patents.

Amplified pattern noise signal PN from preamplifier 24 is applied to a minus input of a subtractor 48 and to an input of a low-pass filter 50. Low-pass filter 50 has a cutoff frequency of about 2 MHz. The low-frequency component of pattern noise signal PNL from low-pass filter 50 is applied to a minus input of a subtractor 52. The video-plus-pattern-noise signal S+PN from preamplifier 26 is applied to a plus input of subtractor 48 and to an input of low-pass filter 54. Low-pass filter 54 has a low-pass characteristic identical to low-pass filter 50; that is, low-pass filter 54 passes frequencies below about 2 MHz and blocks higher frequencies. The low-frequency components SL+PNL from low-pass filter 54 are delayed one horizontal interval in a 1H delay 56, to make them coincide with corresponding noise components from low-pass filter 50, before being applied to a plus input of subtractor 52. Since substantially all of the noise resulting from capacitance differences in the cells of charge-injection device 16 fall below the cutoff frequency of low-pass filter 50 and low-pass filter 54, and since both signals subtracted in subtractor 52 are derived from the same cells of charge-injection device 16, substantially complete and perfect cancellation of pattern noise due to cell capacitance differences is achieved in subtractor 52. Thus, the output SLD of subtractor 52 is a substantially perfect representation of the low-frequency components of the video signal from charge-injection device 16 from which all of the pattern noise has been cancelled. If the output SLD of subtractor 52 were displayed (after the addition of appropriate synchronizing signals) on video monitor 30 (FIG. 1), the displayed signal would be noise free, but would lack the fine details which are contained in the removed high-frequency component.

The existence of mutual capacitances 47 between row conductors 36 and column conductors 40 couples switching noises generated by column control circuit 42 onto row conductors 36 and thus couples switching noises into the video connected through row control circuit 38 to pattern noise processor 28. I have discovered, however, that the most objectionable parts of such switching noises are found below about 2 MHz. In addition, although switching noises above 2 MHz may be inconvenient when displayed on a monitor with high video gain, their amplitude can be reduced to a small fraction of the amplitude of the video signals upon which they are superimposed.

Still referring to FIG. 2, subtractor 48 subtracts the pattern noise PN of the preceding row from the video plus pattern noise of the current row and applies the result to high-pass filter 58. Due to the similarity between the pattern noise in corresponding cells of adjacent rows, subtractor 48 provides a substantial reduction in the pattern noise applied to high-pass filter 58. High-pass filter 58 has a high-pass characteristic which is the complement of low-pass filters 50 and 54; that is, high-pass filter 58 passes all frequency components above about 2 MHz and blocks those below 2 MHz. The output SH+PNH of high-pass filter 58 represents the high-frequency components of video S with the noise PN substantially reduced by cancellation in subtractor 48. Low-amplitude portions of signal SH+PNH are removed in a low-level clipper 60. Since substantially all of the noise PNH in the high-frequency signal is of low amplitude compared to the amplitude of the high-frequency component of the video signal SH, a moderate level of clipping within low-level clipper 60 is capable of removing substantially all of the high-frequency noise PNH and of applying a substantially pure high-frequency component of the video signal SH to a 1H delay 62. The substantially pure high-frequency component SH of the video signal is delayed within 1H delay 62 for one horizontal interval before applying a delayed high-frequency component SHD to a plus input of an adder 63. The output SLD of subtractor 52, which is a substantially pure delayed low-frequency component, is applied to a second plus input of adder 63. The output of SLD+SHD of adder 63 is an essentially pure replica of the original video signal S with both low-frequency and high-frequency noises cancelled.

Figure 3A:
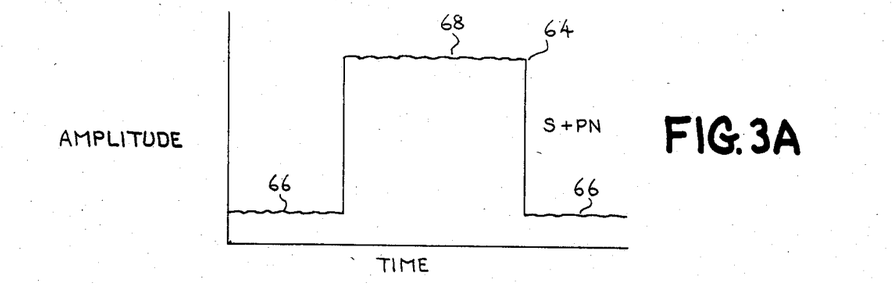
FIGS. 3A–3D are curves to which reference will be made in describing the operation of the solid state imaging system of FIG. 2.
Figure 3B:
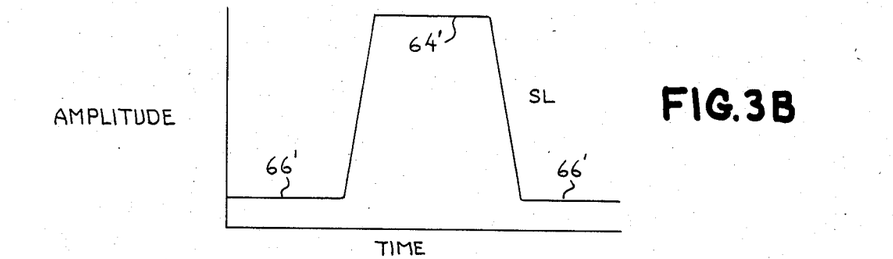

Referring to FIG. 3A, a single line of video read out from one row of charge-injection device 16 containing video plus switching pattern noise S+PN is shown. Low-frequency noise is omitted from FIG. 3A. The scene producing the video signal of FIG. 3A is one having a single bright central portion surrounded on each side by a dark portion giving rise to a single steep-sided, high-amplitude portion 64 surrounded on each side by a lower amplitude portion 66. Switching noises appear as ripples 68 on high-amplitude portion 64 and lower amplitude portions 66 having peak-to-peak maximum amplitudes which are very much smaller than the amplitudes of the excursions of the video signal between lower amplitude portions 66 and high-amplitude portion 64. The low-frequency component of the video signal SL (See FIG. 2), such as may be seen exiting low-pass filter 50, is shown in FIG. 3B. Due to the filtering action of low-pass filter 50 and low-pass filter 54, ripples 68 superimposed on the video signal of FIG. 3A are completely removed. Thus, ignoring low-frequency noise, high-amplitude portion 64' and lower amplitude portions 66' are smooth and ripple-free. Unfortunately, the loss of the high-frequency components causes the sides of the transitions between lower amplitude portions 66' and high-amplitude portions 64' to slope rather than to rise steeply as was the case with the unfiltered signal in FIG. 3A.

Figure 3C:
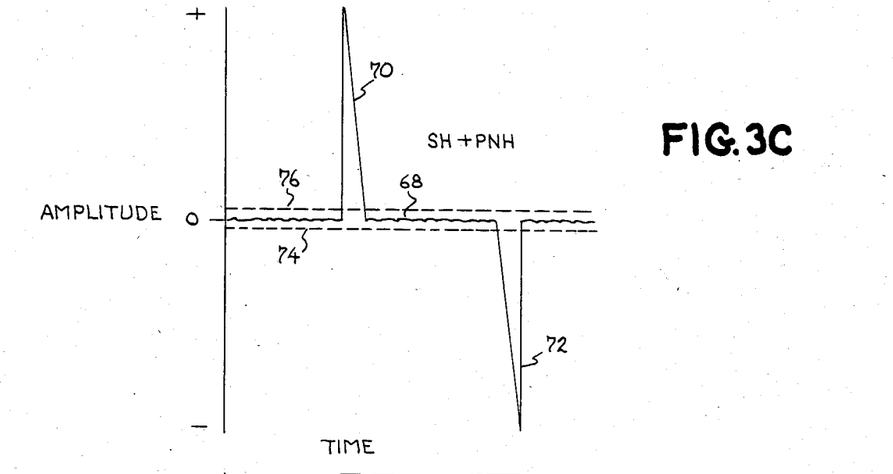

Referring now to FIG. 3C, the output SH+PNH of high-pass filter 58 (FIG. 2) is shown containing the high-frequency video component SH with the high-frequency pattern noise PNH superimposed thereon. High-frequency video component SH includes a sharp positive-going peak 70 coinciding with the positive excursion of the unfiltered video signal and a sharp negative-going peak 72 coinciding with the negative excursion of the unfiltered video signal. Except for sharp positive-going peak 70 and sharp negative-going peak 72, the high-frequency video signal plus high-frequency pattern noise SH+PNH remains in the vicinity of zero, disturbed only by low-amplitude ripples 68. It will be recognized that virtually all of the information in the high-frequency signal shown in FIG. 3C is contained in sharp positive-going peak 70 and sharp negative-going peak 72. Low-level clipper 60 (FIG. 2) removes all low-amplitude components of the signal in between lower clipping limit 74 and upper clipping limit 76 to totally eliminate substantially all of ripples 68 from its output and to produce the substantially pure high-frequency video component SH.

Figure 3D:
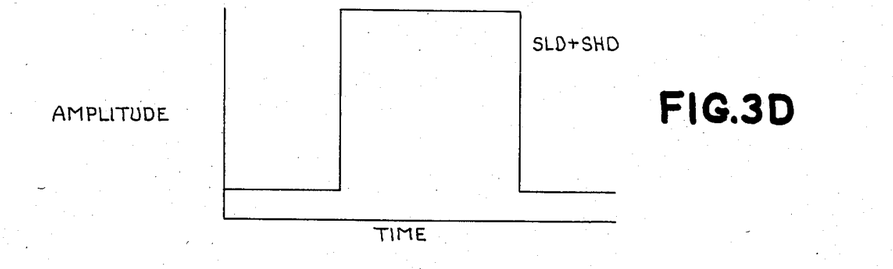

Referring now also to FIG. 3D, when sharp positive-going peak 70 and sharp negative-going peak 72 of FIG. 3C are added to the filtered low-frequency video component of FIG. 3B, both delayed by one horizontal interval in their respective 1H delay lines, the original steep-sided video signal of FIG. 3A, without the high-frequency switching noise represented by ripples 68, is produced.

According to the preceding, the low-frequency pattern noise in the video output of charge-injection device 16 is cancelled by subtracting the low-frequency component of pattern noise of a row from the delayed low-frequency component of the video signal which is accompanied by low-frequency component of pattern noise of the same row. The high-frequency pattern noise in the high-frequency component of the video signal read out from a row is cancelled by clipping or eliminating low-amplitude components of the high-frequency component of the video signal. The clipped high-frequency component is delayed to align it with the noise-cancelled low-frequency component before adding the low-frequency and high-frequency components to produce the entire noise-cancelled video signal.

Figure 4:
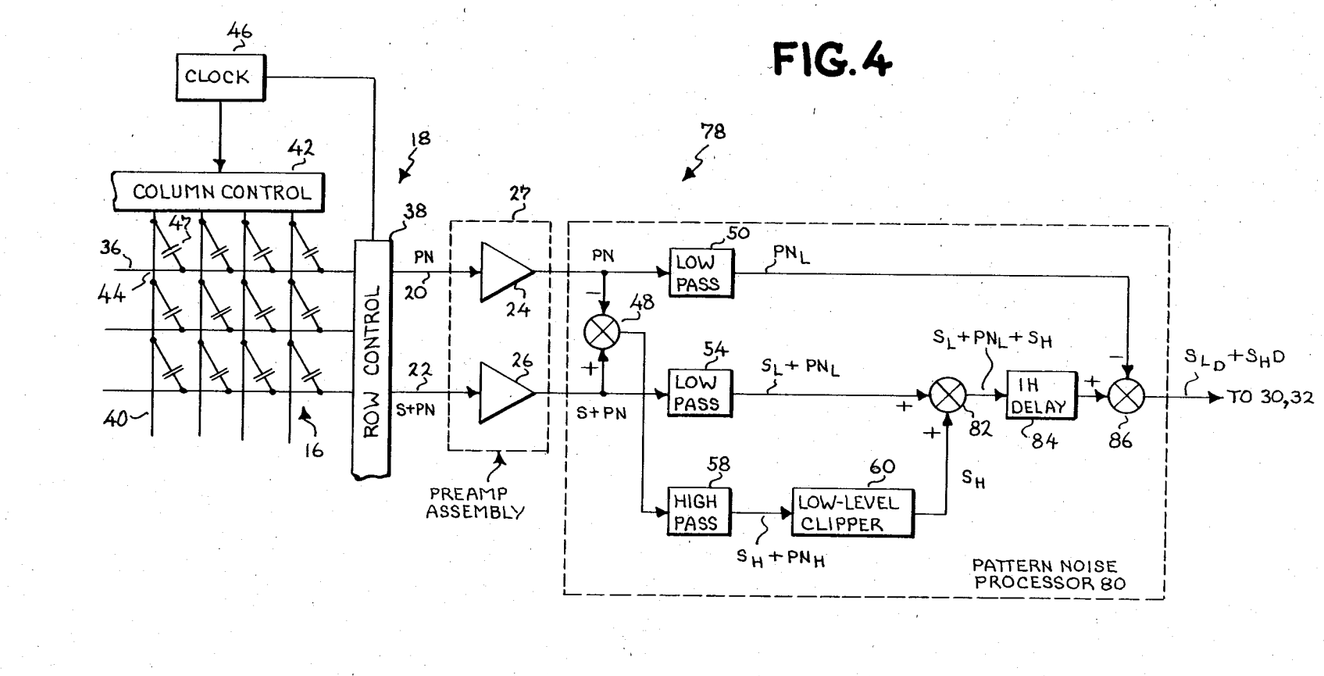
FIG. 4 is a block and schematic diagram of a solid sate imaging system according to a further embodiment of the invention.

Referring now to FIG. 4, there is shown, generally at 78, a further embodiment of a solid state imaging system. Except for certain differences in a pattern noise processor 80, solid state imaging system 78 is identical to solid state imaging system 10 of FIG. 2, thus, the following description is directed specifically to pattern noise processor 80. As in the prior embodiment, the pattern noise signal PN is applied to a minus input of subtractor 48 and to an input of low-pass filter 50. The video-signal plus-pattern-noise S+PN is applied to a plus input of subtractor 48 and to an input of low-pass filter 54. The noise-reduced output of subtractor 48 is applied to high-pass filter 58. Low-level clipper 60 removes low-amplitude components in the output of high-pass filter 58 and applies the resulting signal to an adder 82. The low-frequency components of video signal plus pattern noise SL+PNL from low-pass filter 54 are applied to a plus input of adder 82. The output of adder 82 is the noise-reduced, high-frequency component of the video signal SH plus the low-frequency components of the video signal and pattern noise SL+PNL. This combined signal from adder 82 is delayed for one horizontal interval in a 1H delay 84 before being applied to a plus input of a subtractor 86. The undelayed low-frequency pattern noise signal PNL from low-pass filter 50 is applied to a minus input of subtractor 86. The subtraction of the undelayed low-frequency pattern noise PNL from the combined signal SL+PNL+SH eliminates the corresponding component from the combined signal to produce a final noise-cancelled, delayed signal SLD+SHD.

A comparison of the embodiments of FIGS. 2 and 4 indicates that the embodiment of FIG. 4 accomplishes the same result as that of FIG. 2 while using only a single 1H delay instead of two 1H delays. This is accomplished by adding the clipped high-frequency video component to the noise-containing low-frequency component and delaying both components in a single delay line.

Figure 5:
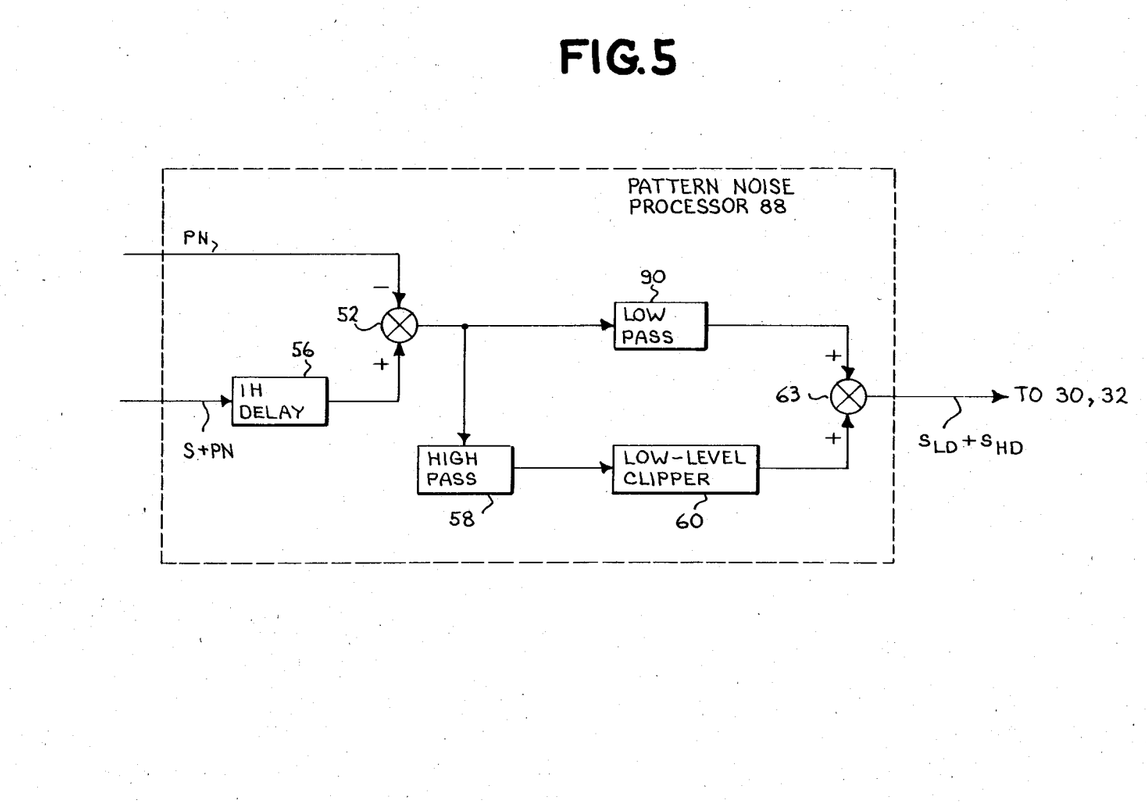
FIG. 5 is a block diagram of a pattern noise processor according to a further embodiment of the invention.

Referring again momentarily to FIG. 2, it is not necessary to locate low-pass filters 50 and 54 upstream of 1H delay 56 and subtractor 52. Referring now to FIG. 5, an embodiment of a pattern noise processor 88 is shown in which a single low-pass filter 90 is disposed downstream of subtractor 52. Since the output of subtractor 52 contains both the high-frequency and the noise-cancelled, low-frequency components of the video signal S, the output of subtractor 52 is applied both to low-pass filter 90 and to high-pass filter 58. The clipped high-frequency component is added to the noise-cancelled, low-frequency component in adder 63 as in the embodiment of FIG. 2. It will be noted that the embodiment of FIG. 5 reduces the required number of low-pass filters from two to one and reduces the number of adders from three to two.

One disadvantage of the circuit of FIG. 5 arises from the direct application of the video signal plus pattern noise S+PN to 1H delay 56. With certain types of delay devices, such as, for example, charge coupled delay devices, high-amplitude noise spikes in the applied signal may be partially attenuated in 1H delay 56 whereas such noise spikes are not attenuated in the undelayed signal fed to subtractor 52. When this occurs, the two sources of pattern noise differ by the amount of attenuation imposed by 1H delay 56. This prevents full cancellation of the pattern noise in pattern noise processor 88. The presence of a low-pass filter upstream of the delay device may be effective to reduce the amplitude of such noise spikes and thus improve the cancellation of pattern noise. Otherwise, the operation of the pattern noise processors of FIGS. 2 and 5 are the same.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A pattern noise processor for cancelling pattern noise in a video signal from a charge-injection device, said charge-injection device being of a type which simultaneously reads out first and second signals, said first and second signals respectively containing contents of corresponding charge storage locations in first and second rows of said charge-injection device, said charge storage locations in said first row containing said video signal and pattern noise, and said charge storage locations in said second row containing only pattern noise, having had any video therein erased comprising:

means for delaying one of said first and second signals for a predetermined time, said predetermined time being sufficient to coincide portions of said one of said first and second signals with portions of the other of said first and second signals originating in the same storage locations of the same row;

means for differencing the delayed and undelayed signals to produce a noise-reduced signal;

means for removing a high-frequency component of said noise-reduced signal above a predetermined frequency to produce a noise-reduced, low-frequency component;

means for passing a high-frequency component of at least said first signal, said high-frequency component including all frequencies above said predetermined frequency;

means for clipping portions of said high-frequency component having positive and negative amplitudes less than a predetermined value to produce a clipped high-frequency component;

means for delaying said high-frequency component for said predetermined time to produce a clipped delayed high-frequency component; and means for adding said clipped high-frequency component and said noise-reduced, low-frequency component.

2. A pattern noise processor according to claim 1 wherein said one of said first and second signals is said first signal and said predetermined time is a horizontal interval.

3. A pattern noise processor according to claim 2 wherein said means for removing a high-frequency component includes first and second low-pass filters, said first and second low-pass filters being disposed upstream of said means for differencing.

4. A pattern noise processor according to claim 1 wherein said means for differencing includes a subtractor having a plus input and a minus input, said first signal being connected to said plus input and said second signal being connected to said minus input.

5. A pattern noise processor according to claim 1 wherein said means for passing a high-frequency component includes a high-pass filter.

6. A pattern noise processor according to claim 1 wherein said means for passing includes:

means for differencing said first signal and said second signal to produce a noise-reduced signal; and a high-pass filter effective to pass substantially all frequencies in said noise-reduced signal higher than said predetermined frequency and to block substantially all frequencies below said predetermined frequency.

7. A pattern noise processor according to claim 1 wherein said means for delaying said high-frequency component includes means for adding said high-frequency component to said first signal before delaying said first signal in said means for delaying one of said first and second signals, and a signal delay device effective to delay both said high-frequency component and said first signal, said means for differencing said delayed and undelayed signals being disposed downstream of said single delay device.

8. A pattern noise processor for cancelling pattern noise in a video signal from a charge-injection device, said charge-injection device being of a type which simultaneously reads out first and second signals, said first and second signals respectively containing contents of corresponding charge storage locations in first and second rows of said charge-injection device, said charge storage locations in said first row containing said video signal and pattern noise, and said charge storage locations in said second row containing only pattern noise, having had any video therein erased comprising:

first low-pass means for passing a first frequency range of said first signal, said first frequency range including substantially all frequencies below a predetermined frequency, and for blocking substantially all frequencies above said predetermined frequency to produce a first low-frequency component;

second low-pass means for passing said first frequency range of said second signal to produce a second low-frequency component;

means for delaying one of said first and second low-frequency components for a predetermined time, said predetermined time being sufficient to coincide portions of said one of said first and second low-frequency components with portions of the other of said first and second low-frequency components originating in the same storage locations of the same row;

means for subtracting the delayed and undelayed low-frequency components to produce a substantially pure low-frequency video component from which low-frequency components of said pattern noise are cancelled;

high-pass means for passing all frequencies in at least said first signal higher than said predetermined frequency to produce a high-frequency component;

means for clipping all portions of said high-frequency component having an amplitude lower than a predetermined positive and negative amplitude to produce a clipped high-frequency component;

means for delaying said clipped high-frequency component for said predetermined time; and means for adding the delayed clipped high-frequency component to said substantially pure low-frequency video component to produce a full-frequency video signal from which both low-frequency and high-frequency pattern noise are substantially eliminated.

9. A pattern noise processor according to claim 8 wherein said means for delaying said clipped high-frequency component is separate from said means for delaying one of said first and second low-frequency components.

10. A pattern noise processor according to claim 8 wherein said means for delaying said clipped high-frequency component is the same as said means for delaying one of said first and second low-frequency components.

11. A pattern noise processor according to claim 8 wherein said first and second low-pass means are disposed upstream of said means for subtracting the delayed and undelayed low-frequency components.

12. A pattern noise processor according to claim 8 wherein said first and second low-pass means includes a single low-pass filter disposed downstream of said means for subtracting the delayed and undelayed low-frequency components.

13. A pattern noise processor according to claim 12 wherein said high-pass means is disposed downstream of said means for subtracting the delayed and undelayed low-frequency components.

14. A method for cancelling pattern noise in a video signal from a charge-injection device, said charge-injection device being of a type which simultaneously reads out first and second signals, said first and second signals respectively containing contents of corresponding charge storage locations in first and second rows of said charge-injection device, said charge storage locations in said first row containing said video signal and pattern noise, and said charge storage locations in said second row containing only pattern noise, having had any video therein erased comprising:

delaying one of said first and second signals for a predetermined time, said predetermined time being sufficient to coincide portions of said one of said first and second signals with portions of the other of said first and second signals originating in the same storage locations of the same row;
differencing the delayed and undelayed signals to produce a noise-reduced signal;
removing a high-frequency component of said noise-reduced signal above a predetermined frequency to produce a noise-reduced, low-frequency component;
passing a high-frequency component of at least said first signal, said high-frequency component including all frequencies above said predetermined frequency;
clipping portions of said high-frequency component having positive and negative amplitudes less than a predetermined value to produce a clipped high-frequency component;
delaying said high-frequency component for said predetermined time to produce a clipped delayed high-frequency component; and
adding said clipped high-frequency component and said noise-reduced, low-frequency component.

* * * * *